United States Patent [19]
Pfau

[11] 4,310,742
[45] Jan. 12, 1982

[54] EDM PROCESS AND APPARATUS FOR MACHINING CAVITIES AND SLOTS IN A WORKPIECE

[75] Inventor: Jean Pfau, Collonge-Bellerive, Switzerland

[73] Assignee: Ateliers des Charmilles, S.A., Geneva, Switzerland

[21] Appl. No.: 111,930

[22] Filed: Jan. 14, 1980

Related U.S. Application Data

[63] Continuation of Ser. No. 862,449, Dec. 20, 1977, abandoned.

[51] Int. Cl.$^3$ .............................................. B23P 1/08
[52] U.S. Cl. .............................. 219/69 M; 219/69 G; 219/69 V
[58] Field of Search ................ 219/69 M, 69 G, 69 V

[56] References Cited

U.S. PATENT DOCUMENTS

| | | | |
|---|---|---|---|
| 3,614,372 | 10/1971 | Dulebohn | 219/69 G |
| 3,758,739 | 9/1973 | De Jongh et al. | 219/69 G |
| 3,849,624 | 11/1974 | Dulebohn et al. | 219/69 G |
| 4,041,268 | 8/1977 | Braudeau et al. | 219/69 G |
| 4,104,501 | 8/1978 | Wyss | 219/69 M |

*Primary Examiner*—C. C. Shaw
*Attorney, Agent, or Firm*—Hauke and Patalidis

[57] ABSTRACT

Process and apparatus for cutting by electrical discharge machining cavities and slots in an electrode workpiece by means of an electrode tool, the electrodes being displaced one relative to the other in translation along a predetermined path. The translation motion is controlled such as to maintain predetermined machining conditions in the machining zone between the electrodes, and for additionally displacing the electrodes relative to each other in a direction different from the direction of the cutting path. The additional relative displacement of the electrode may be linear, non-linear, slanted or curvilinear.

12 Claims, 6 Drawing Figures

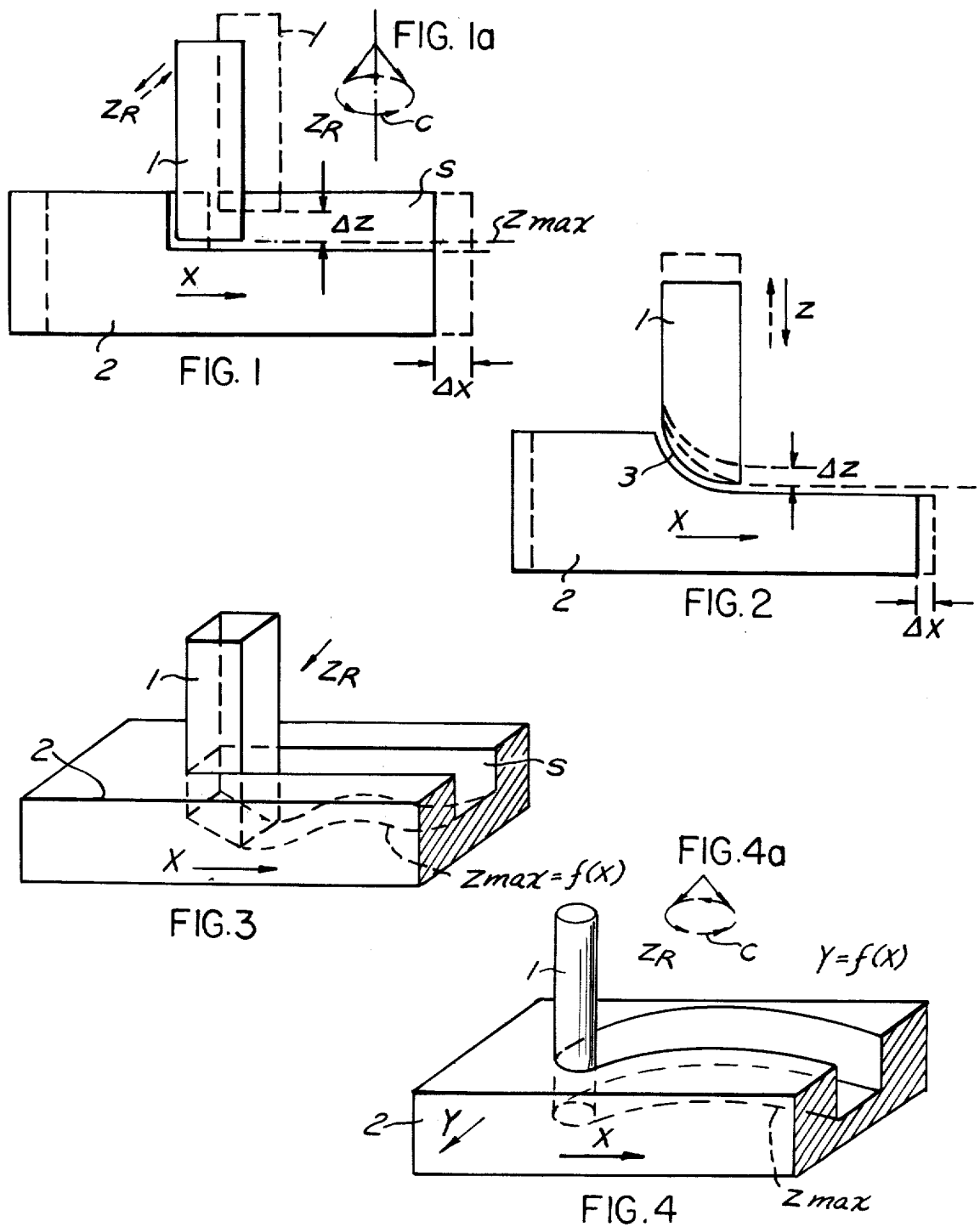

EDM PROCESS AND APPARATUS FOR MACHINING CAVITIES AND SLOTS IN A WORKPIECE

CROSS-REFERENCE TO RELATED APPLICATION

This application is a continuation of application Ser. No. 862,449, filed Dec. 20, 1977, now abandoned.

BACKGROUND OF THE INVENTION

The present invention relates to a method and apparatus for machining cavities and slots in an electrode workpiece by electrical discharge machining by means of an electrode tool, wherein each electrode is displaced in a predetermined direction at an appropriate rate by way of its own servo-motor feed mechanism.

It is known, in EDM technology, to displace the electrodes in different directions, for example for cutting a workpiece according to a programmed path by means of a wire electrode. It is also known to control the displacement of the electrode tool in the same predetermined direction by means of two servo-motors, one providing rapid feed of the electrode tool and having a limited travel, and the second providing slow feed but having a substantial travel, the displacement effected by the second servo-motor being controlled as a function of the displacement controlled by the first motor. Such an arrangement is disclosed in U.S. Pat. No. 3,758,739.

Another known EDM process utilizing one or two servo-motors consists in relatively displacing the electrodes according to a translation motion following either a linear path different from the axis of feed of the electrode tool into the electrode workpiece, or a path inscribed on a surface of revolution of increasing cross-section in the direction of the axis of penetration of the electrode tool into the electrode workpiece. Such an arrangement, using a single servo-motor is disclosed in German Patent publication No. 2,238,698 and Swiss patent No. 588,917 and the corresponding application in the United States, Ser. No. 696,713, filed June 16, 1976 now U.S. Pat. No. 4,104,501, assigned to the same assignee as the present application.

The present invention relates to a method and apparatus permitting to form by EDM cavities and slots in an electrode workpiece by displacing the electrode tool and the electrode workpiece relative to each other according to a translation motion along a predetermined path, such relative displacement being controlled on the one hand such as to maintain predetermined machining conditions in the machining zone beween the electrodes, and on the other hand such as to cause the relative position of the electrodes to reach a value at most equal to a predetermined limit value.

SUMMARY

The method and apparatus of the invention permits to effectuate an additional relative displacement of the electrodes in a direction different from that of the path of the electrodes translation motion, such additional displacement being effected as a function of the error between the amplitude of the translation motion and the predetermined limit value.

By means of the apparatus of the invention, cavities and slots of large dimensions can be cut with accuracy, at high machining rates and in an economical manner. By using the method and apparatus of the invention it becomes possible to cut long slots in workpieces by displacing the electrodes by means of servo-motors, one of which only requires to be provided with high dynamic performances, the other servo-motor being provided with characteristics such as to be relatively inexpensive. A further advantage of the invention is its capacity for achieving at all times, in view of its capability for providing a slanted relative translation motion of the electrodes, a rapid and effectual retraction of the electrode tool upon detecting abnormal machining conditions, which insures that an optimum machining rate is achieved even when deep slots are cut in the workpiece. The invention further permits to provide at relatively low cost, EDM equipment permitting to cut in a workpiece curvilinear slots of any appropriate regular or irregular shape.

BRIEF DESCRIPTION OF THE DRAWING

A better understanding of the present invention will be had by those skilled in the art upon reading the following description of the best mode contemplated for practicing the invention together with the accompanying drawing wherein:

FIGS. 1 through 4a schematically illustrate four examples of machining operations which are within the capability of the present invention.

DETAILED DESCRIPTION OF THE PREFERRED EMBODIMENT

Figure 5:
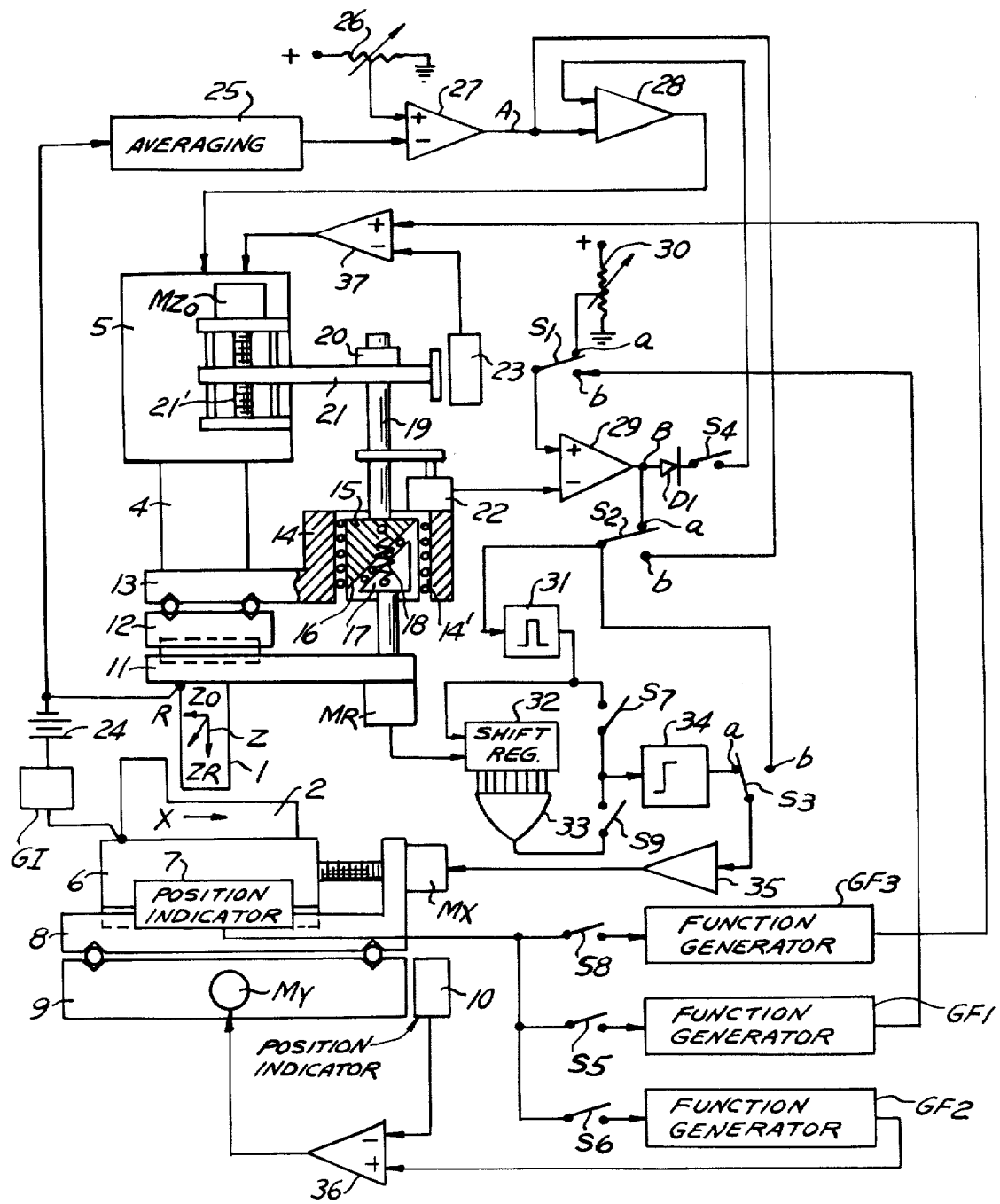
FIG. 5 is a schematic illustration of an arrangement permitting to effectuate all of the machining operations illustrated at FIGS. 1–4.

Referring to the drawing, and more particularly to FIG. 1, there is schematically illustrated an electrode tool 1 which is displaced according to a linear translation motion in a direction ZR while an electrode workpiece 2 is simultaneously displaced in a direction X different from the direction ZR. When the feed of the electrode tool 1 into the workpiece 2 reaches a predetermined depth Zmax, the workpiece 2 is displaced of a distance ΔX in a direction X without interrupting machining. As the direction ZR is slanted at an angle relative to the direction X, the displacement of the workpiece 2 automatically causes, through the usual servo-motor arrangement customary in electrical discharge machining for maintaining the machining gap at an appropriate width, a withdrawal of the electrode tool 1 on the direction ZR. The electrode tool 1 therefore is vertically displaced of a distance ΔZ from the bottom of the slots in the process of being machined in the workpiece 2.

It will be appreciated that the translation motion along a slanted direction ZR presents many advantages because, in the event that short-circuits occur between the electrode tool 1 and the electrode workpiece 2, retraction of the electrode tool along the slanted direction ZR results in withdrawing from the workpiece surface the end face of the electrode tool as well as the front lateral face of the electrode tool.

If it is acceptable not to achieve the above mentioned advantage, it is evident that the workpiece 2 may be displaced in the direction which is perpendicular to the direction ZR of the electrode tool 1.

According to a modification of the process, the electrode tool could be displaced relative to the workpiece according to a cyclical translation motion having a conical path, as schematically illustrated at FIG. 1a, limiting means being provided for avoiding that the path of the electrode overstep the circular path C. In this manner, and by modifying the diameter of the limit circular path C, a single electrode of given dimension may be used for machining slots of different widths.

FIG. 2 schematically illustrates a machining operation in which the displacement of the workpiece 2 along the direction X is effected at a right angle to the direction of feed Z of the electrode tool into the workpiece. However, the active end face 3 of the electrode tool 1 is at a slant relative to the direction Z, such that if the electrode tool is retracted, for example when a short-circuit occurs, there automatically results an increase of the machining gap across the full machining zone area.

FIG. 3 illustrates an operation having somewhat an analogy with the operation illustrated at FIG. 2, but in which the machining depth, that is the depth of the slots, is subjected to a series of variations instead of being held constant. The variation of the slot depth is obtained by an appropriate programming of the limit depth parameter $Z_{max}$ as a function of the instantaneous position of the machining zone in the slot S. In the conditions of operation illustrated at FIG. 3, the translation motion $Z_R$ of the electrode tool 1 can be effected vertically as well as at a slant relative to the horizontal faces of the workpiece 2.

FIG. 4 schematically illustrates a further machining condition in which the workpiece 2 is displaced simultaneously in the directions X and Y. The directions X and Y are perpendicular to the longitudinal axis of the electrode tool 1. The displacement of the workpiece along the direction Y is, for example, determined as a function of the displacement along the direction X, which permits to obtain a slot S having a curvilinear shape as determined by an appropriate equation representing the relationship between the electrode position coordinates. In such an arrangement, the translation motion of the electrode tool 1 may be linear as well as circular, or along a conical path as schematically shown at FIG. 4a.

In each one of the machining operations hereinbefore described, the motion of the workpiece 2 may be effected either continuously during progression of the machining operation or by successive increments. If machining is effected incrementally step by step, it may be found advantageous to interrupt machining or, in the alternative, to withdraw the electrode tool 1 during the displacement of the workpiece along the X- or Y-axis, or both.

It will be observed that the displacement along the X-axis is a relative displacement between the electrode tool 1 and the workpiece which can be effected either by displacing the workpiece 2 or by displacing the electrode tool 1. The same observation applies to the displacements along the translation direction Z and the slant translation motion ZR.

FIG. 5 is a schematic diagram of a structural arrangement permitting to effectuate the machining operations illustrated at FIGS. 1-4. As illustrated at FIG. 5, the electrode tool 1 is mounted by convenient means on the end of a reciprocable ram 4 driven by means of a servo-motor 5. The servo-motor 5 is controlled in such a manner as to maintain an appropriate machining gap between the electrode tool 1 and the workpiece 2.

The workpiece 2 is mounted on a cross-slide table comprising an upper slide 6, to which the workpiece is attached, capable of being linearly displaced along the X-axis, in the plane of the drawing, by a servo-motor MX. A position indicator 7 supplies an electrical signal which is representative of the position of the upper slide 6 relative to an intermediary slide 8. The intermediary slide 8 is slidably supported by a stationary saddle 9, the displacement of the intermediary slide 8 being effected along the Y-axis in a direction perpendicular to the X-axis and to the plane of FIG. 5. The displacement of the intermediary slide 8 along the Y-axis is effected by a servo-motor MY. The position of the intermediary slide 8 relative to the stationary saddle 9 is monitored by a position indicator 10 providing a signal representative of the relative position of the intermediary slide 8.

A cross-slide table supports the electrode tool 1 on the end of the ram 4. The cross-slide table comprises a slide 11 on the bottom of which is mounted the electrode tool 1, arranged to be displaceable along the X-axis, relative to an intermediary slide 12 arranged to be displaceable along the Y-axis. The intermediary slide 12 is displaceable relative to a saddle 13 fixedly mounted on the end of the arm 4. The saddle 13 fixedly supports a block 14 having a vertical bore 14' in which is disposed a rotatable cylindrical member 15 which is also freely displaceable longitudinally within the bore 14' in the block 14. The rotatable member 15 has a lower face 16 disposed at a 45° angle relative to the axis of the bore 14'. A camming member 17, having an upper face also disposed at 45° relative to the axis of the bore 14', is constantly urged in sliding engagement with the rotatable member 15 by a spring 18. A motor MR drives in rotation the camming member 17 and the cylindrical rotatable member 15. The cylindrical rotatable member 15 is fastened on the end of a shaft 19 provided at its upper end with an abutment 20 adapted to cooperate with an adjustable abutment arm 21. The vertical position of the abutment arm 21 can be changed by means of a jackscrew 21' driven by motor MZo.

When the electrode tool 1 is fed toward the workpiece 2, that is during vertical downward feed of the electrode tool, the cylindrical member 15 is prevented from being downwardly displaced as soon as the abutment 20 on the end of the shaft 19 engages the abutment arm 21. This causes the cylindrical member 15 to be longitudinally displaced upwardly relative to the bore 14', which causes the camming member 17 to be laterally displaced relative to the cylindrical member 15. The camming member 17 therefore occupies an eccentric position relative to the axis of the bore 14' and, if the motor MR is rotated, the slide 11 is displaced relative to the saddle 13 according to a circular motion of a radius corresponding to the amount of eccentricity between the members 15 and 17. In such manner, starting from a position $Z_O$ of the electrode tool 1 for which the abutment 20 engages the abutment arm 21, any downward displacement of the electrode tool along the Z-axis is accompanied by a corresponding radial displacement R of the electrode tool 1.

The amount of eccentricity R between the members 15 and 17 is measured by an indicator 22 which supplies at its output a corresponding analog signal. In a similar manner, the instantaneous position of the movable abutment arm 21 is converted into an electrical signal supplied by a position detector 23.

The machining current is supplied, in a manner which is conventional in EDM, by a DC power supply 24 and a pulse generator GI connected across the electrode tool-electrode workpiece circuit.

The machining voltage is supplied to an averaging circuit 25 supplying at its output an analog signal representing the average value of the machining voltage. The signal representing the average value of the machining voltage is compared to a reference voltage, supplied by a potentiometer 26, in a differential amplifier 27. The differential amplifier 27 supplies at its output an analog signal A representative of the corrections of the speed of the electrode 1 that must be controlled by the servo-motor 5. For that purpose, the signal A is applied to the servo-motor 5 through a power amplifier 28.

The arrangement of FIG. 5 further comprises a differential amplifier 29 having an input to which is applied the signal from the eccentricity indicator 22 and another input to which is applied, through a double-pole switch S1 when in the position a, a reference voltage obtained from a potentiometer 30.

The signal at the output of the differential amplifier 29 may also be applied through a diode D1 and a switch S4 to a second input of the power amplifier 28 for enabling the power amplifier 28 to provide to the servo-motor 5 a signal commanding the advance of the electrode tool 1 toward the electrode workpiece 2.

It will be appreciated that the differential amplifier 29 has a very high gain such that as soon as the signal supplied by the eccentricity indicator 22 reaches the reference voltage obtained from the potentiometer 30, the signal B at the output of the differential amplifier 29 reaches a value high enough to inhibit the power amplifier 28 from passing the signal of the proper polarity capable of flowing through the diode D1.

The signal B at the output of the differential amplifier 29 may also be applied through a double-pole switch S2 and through a shaping circuit 31 to a shift register 32 having another input receiving command pulses from the motor MR, which is a stepping motor. The shift register 32 is coupled, at its output, to the input of an AND gate 33 having an output connected through a switch S9 to a monostable multivibrator 34. The control circuit for the motor MR is not shown, as it consists of any conventional known control means. If machining is effected with the electrode tool 1 being controlled such as to be displaced according to a circular translation motion, or orbiting motion, the motor MR is activated continuously. If, on the contrary, the motor MR is stopped, the feed of the electrode tool 1 is effected along a linear motion. Under those conditions, the shift register 32 and the AND gate 33 are not used and can be shunted by a switch S7.

A double-pole switch S3 permits to apply to a power amplifier 35 controlling the motor MX either the signal B from the output of the differential amplifier 29, through the switch S2, or the signal at the output of the multivibrator 34, according to the position of the movable contact of the switch 23 being engaged with terminal a or terminal b, respectively.

The apparatus of FIG. 5 further comprises three function generators GF1, GF2 and GF3, each arranged to accept the signal at the output of the position indicator 7, such a signal being representative of the position of the slide 6 along the X-axis, through respective switches S5, S6 and S8, to supply at their output a signal which is a predetermined function of the input signal. The signal at the output of the function generator GF1 is applied to the terminal b of the switch S1.

The signal at the output of the function generator GF2 is applied to an input of a differential amplifier 36 receiving at its other input the output signal from the position indicator 10, which is indicative of the position along the Y-axis of the electrode workpiece 2. The output of the differential amplifier 36 is connected to the motor MY, and activates the motor MY until the position along the Y-axis, as detected by the position indicator 10, corresponds to the position command signal at the output of the function generator GF2. The function generator GF3 is connected, at its output, to one of the input of a differential amplifier 37 whose other input receives from the position detector 23 a signal corresponding to the position Zo. The differential amplifier 37 controls the motor MZo to adjust the position of the abutment arm 21 according to the signal at the output of the function generator GF3.

In order to effectuate a machining operation as diagrammatically illustrated at FIG. 1, the switches S1, S2 and S3 are at their position a and the switches S4 and S7 are closed. With such a setting, the feed of the electrode tool 1 along the Z-axis is effected until the abutment 20 engages the abutment arm 21, and is continued thereafter while simultaneously causing a lateral displacement of a radial component R increasing as a function of the electrode feed along the Z-axis until the radial component R reaches a limit value determined by the potentiometer 30. When the limit value is reached, the signal B reaches a value which is opposite and equal to the signal A commanding the electrode feed, which in turn causes the electrode tool to be no longer fed along the Z-axis and to hold its longitudinal position. Simultaneously, the signal B is applied through the shaping circuit 31 and the switch S7, which is closed, to the input of the multivibrator 34 for switching the multivibrator to its unstable mode. As long as the multivibrator 34 is unstable, a signal supplied at its output is applied through the switch S3 to the input of the motor MX for displacing the workpiece 2 along the X-axis.

It will be appreciated that a similar function is effected if the double-pole switch S2 is placed on its position b. As soon as the signal A reaches the value required for driving the shaping circuit 31, that is for a predetermined feed of the electrode tool 1 into the workpiece 2, the signal at the output of the shaping circuit 31 operates the multivibrator 34 in the same manner as previously explained with respect of the signal B being applied to the input of the multivibrator.

For effecting the operation illustrated at FIG. 2, the position of the abutment 21 is adjusted such as to make the abutment inoperative, with the result that the electrode tool 1 is fed exclusively in a longitudinal direction.

In order to effectuate the operation illustrated at FIGS. 3 and 4 or, in the alternative, for effecting an operation which is a combination of both, the switch S5 is closed and the switch S1 is placed in the position b to replace the voltage reference from the potentiometer 30 by a voltage varying as a function of the position along the X-axis. With such a setup, a slot of variable depth, as shown at FIG. 3, is obtained.

Closing of the switch S6 controls the operation of the motor MY as a function of the instantaneous position along the X-axis and permits to obtain a curvilinear slot as illustrated at FIG. 4.

Closing of the switch S8 permits to change the position Zo, that is the depth of cut reached before either a circular translation motion (with the motor MR operating continuously) or a motion of radial component R (when the motor MR is stopped) is applied to the electrode tool. In other words, such a setup permits to vary the radius of translation as a function of the displacement along the X-axis and, consequently, to vary the width of the slot obtained with an electrode tool of predetermined dimension, the depth of the slot being adjusted by means of the function generator GF3.

When it is desired to machine with a circular translation motion, the stepping motor MR is actuated continuously, the switch S7 is open and the switch S9 is closed. The motor MX is controllably activated by storing in the shift register 32, after shaping in the shaping circuit 31, the signal A or the signal B, the stored data corresponding to a predetermined angular position of the translation device, the angular position being monitored, for example, by a pulse generator incorporated in the motor MR. When the limit amplitude of the translation motion is reached during a complete cycle of translation, that is, when the signal A or the signal B appears for each angular position of the translation device, the AND gate 33 provides at its output a command pulse of predetermined duration of the motor MX through the operation of the monostable multivibrator 34.

The limit value of the amplitude of translation motion provided by the servo-motor 5 can be obtained by means of the servo-motor MX. In such a case, the switches S2 and S3 are each in their position b and the switch S4 is open. The signal B controls, by means of the motor MX, a displacement of the electrode workpiece 2 in the direction of the X-axis as soon as the limit value of the displacement of the electrode tool 1 is reached, which has for effect to prevent the electrode tool from being fed beyond the limit value. The apparatus of FIG. 5 can also function by using incremental advance servo-motors, for example stepping motors, controlled by numerical data.

I claim:

1. A method for machining by EDM cavities and slots in an electrode workpiece by means of an electrode tool wherein said electrodes are displaced relative to each other in a first direction and in a second direction, said displacement being controlled in such a manner as to maintain a predetermined machining condition in a machining zone between said electrodes and as to maintain a relative position between said electrodes at most equal to a predetermined limit value, and effecting said second displacement in said second direction as a function of the difference between the amplitude of said displacement in said first direction and said predetermined limit value.

2. The method of claim 1 wherein said second displacement in said second direction is effected step by step, each of said steps being effected as soon as said limit value is reached.

3. The method of claim 1 wherein said limit value varies as a function of said second displacement in said second direction.

4. The method of claim 1 wherein said second direction in which is effected said second displacement varies as a function of said second displacement.

5. The method of claim 1 wherein said limit value and said second direction in which said second displacement is effected vary as a function of said second displacement.

6. The method of claim 1 wherein said first and second directions are perpendicular one relative to the other.

7. The method of claim 1 wherein said first direction is at a substantially 45° angle to said second direction.

8. The method of claim 1 wherein said displacement in said second direction is along two perpendicular axes resulting in a closed path inscribed on a surface of revolution of increasing radius as a function of said displacement in said first direction, and wherein said displacement in said second direction is effected as soon as the amplitude of displacement in said first direction reaches said limit value.

9. An apparatus for machining by EDM cavities and slots in an electrode workpiece by means of an electrode tool comprising a first servo motor displacing said electrode tool in a first direction, a second servo-motor displacing said electrode workpiece in a second direction, said first servo-motor being controlled as a function of a first signal representing a predetermined machining condition in a machining zone between said electrode tool and said electrode workpiece and as a function of a second signal representing the difference between the amplitude of relative displacement in said first direction and a reference amplitude limit such as to maintain a relative position between said electrode tool and said electrode workpiece at most equal to a predetermined limit value, and means for controlling said second servo-motor as a function of the variations of said second signal.

10. The apparatus of claim 9 further comprising means for controlling said second servo-motor such as to effectuate relative displacement of said electrodes of a predetermined distance in said second direction as soon as said second signal varies of a predetermined value.

11. The apparatus of claim 9 further comprising a cross-slide table on which one of said electrodes is affixed, said table being displaced in said second direction by means of said second servo-motor and in a third direction by means of a third servo-motor, means developing a third signal representing the displacement of said table as controlled by said second servo-motor, and means controlling said third servo-motor as a function of said third signal.

12. The apparatus of claim 9 further comprising a cross-slide table on which one of said electrodes is affixed, said table being displaced in said second direction by means of said second servo-motor and in a third direction by means of a third servo-motor, means developing a third signal representing the displacement of said table as controlled by said second servo-motor, and means varying said reference amplitude limit as a function of said third signal.

* * * * *